United States Patent [19]

Matsui et al.

[11] Patent Number: 4,726,869
[45] Date of Patent: Feb. 23, 1988

[54] ADHESIVE AND METHOD OF JOINTING ARTICLES OF POLYOLEFIN USING THE SAME

[75] Inventors: Masatake Matsui, Nishinomiya; Chiaki Momose, Takarazuka; Kazunori Terasaki, Nishinomiya, all of Japan

[73] Assignee: Dainichi-Nippon Cables, Ltd., Hyogo, Japan

[21] Appl. No.: 781,318

[22] Filed: Sep. 30, 1985

Related U.S. Application Data

[63] Continuation of Ser. No. 451,392, Dec. 20, 1982, abandoned.

[30] Foreign Application Priority Data

| Dec. 29, 1981 | [JP] | Japan | 56-211628 |
| Apr. 30, 1982 | [JP] | Japan | 57-73920 |
| May 31, 1982 | [JP] | Japan | 57-93382 |
| May 31, 1982 | [JP] | Japan | 57-93749 |

[51] Int. Cl.⁴ .............................................. C09J 5/02
[52] U.S. Cl. ........................... 156/307.3; 156/294; 156/304.2; 156/322; 156/329; 156/334; 285/284; 285/423; 526/279; 525/263; 525/288
[58] Field of Search .................... 156/307.3, 304.2

[56] References Cited

U.S. PATENT DOCUMENTS

| 2,992,457 | 7/1961 | Harrison | 156/294 |
| 3,406,055 | 10/1968 | Rubel | 156/322 |
| 3,622,440 | 11/1971 | Snedeker et al. | 156/334 |
| 3,646,155 | 2/1972 | Scott | 260/827 |
| 3,788,928 | 1/1974 | Wise | 156/294 |
| 3,826,704 | 7/1974 | Ohya et al. | 156/322 |
| 4,136,132 | 1/1979 | Poole | 525/288 |

FOREIGN PATENT DOCUMENTS

| 51-101081 | 9/1976 | Japan . |
| 54-149741 | 11/1979 | Japan | 525/288 |
| 865806 | 4/1961 | United Kingdom . |

OTHER PUBLICATIONS

H. G. Scott et al., *Modern Plastics*, pp. 82–87, of Mar. 1973.

*Primary Examiner*—John J. Gallagher
*Attorney, Agent, or Firm*—Armstrong, Nikaido, Marmelstein & Kubovcik

[57] ABSTRACT

An adhesive, suitable for joining cured polyolefin articles, comprising a water curable polyolefin having a melt index of from 0.1 to 20, and a method of joining cured polyolefin articles, especially cured polyethylene pipes, comprising a step to apply the above adhesive to the surface of the articles and a step to join both of the surfaces to each other with the melt of the adhesive.

11 Claims, 3 Drawing Figures

ADHESIVE AND METHOD OF JOINTING ARTICLES OF POLYOLEFIN USING THE SAME

This application is a continuation of application Ser. No. 451,392, filed Dec. 20, 1982, now abandoned.

BACKGROUND OF THE INVENTION

(1) Field of the Invention

The present invention relates to a novel adhesive suitable for jointing a variety of articles, especially shaped articles of cured polyolefin and a method of jointing articles of cured polyolefin using the adhesive.

(2) Description of the Prior Art

Since cured polyolefin is superior to uncured polyolefin in heat resistance, mechanical strength, especially in resistance to environmental stress cracking, shaped articles of cured polyolefin are increasing more and more in kind and amount product. For instance, a cured polyolefin pipe appear useful as gas pipe, tap water pipe, and hot water pipe.

There have been proposed several methods of jointing cured polyolefin pipe without using metallic joints which have been used heretofore and have shortcomings, such as high cost and corrosiveness. Those methods, however, have not found practical use yet. For example, a method of heat adhering two cured polyolefin pipes has the drawback that because the cured polyolefin does not melt well due to its crosslinked molecular structure, joining strength is not very good so that flow of a pressurized liquid or heat cycles of the pipe often cause disconnection of the joint portion.

A method of using an adhesive consisting of a polar organic material has been tested. However, its adhesion is not enough, owing to the non-polarity or low polarity of cured polyolefin.

On the other hand, experiments of the inventors of the present invention had revealed that ordinary polyolefin, such as polyethylene, will function as an adhesive for cured polyolefin. Ordinary polyolefin, which has excellent adhesion for a short period of time, such as for about one month after the joining, however, has a problem that its adhesion gradually deteriorates. In this case, at an early stage after joining, temporal entanglements and physico-chemical adherence between the molecules on the surface of a cured polyolefin article and the polyolefins of adhesive provide excellent joining strength, which is gradually weakened by the action of various forces such as a force due to thermal expansion and contraction of the joint portion.

SUMMARY OF THE INVENTION

An object of the present invention is to provide a novel adhesive with excellent adhesion for a long period of time.

Another object of the present invention is to provide an adhesive for joining cured polyolefin articles.

A further object of the present invention is to provide an adhesive for joining cured polyolefin pipe.

A still further object of the present invention is to provide a method of joining shaped articles of cured polyolefin, especially cured polyolefin pipes by using said adhesive.

Therefore, the present invention provides, in one aspect, an adhesive comprising a water curable polyolefin having a melt index of from 0.1 to 20, and, in another aspect, a method of joining polyolefin articles one or both of which surfaces to be joined have a gel fraction of at least 5% by weight, which comprises a step of applying an adhesive comprising a water curable polyolefin to one or both of the above surfaces and a step of joining both of the surfaces to each other with said adhesive.

DETAILED DESCRIPTION OF THE INVENTION

Figure 1:
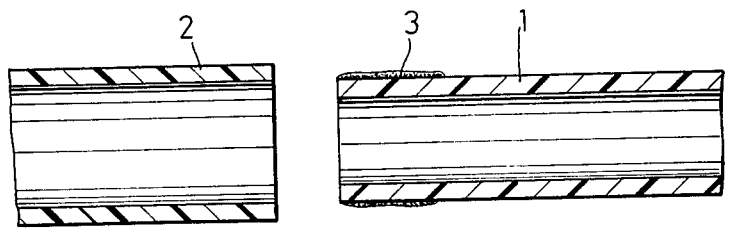
FIGS. 1-3 are sectional views for explaining steps of an aspect of the invention's method for joining a cured polyolefin pipe and a cured polyolefin socket joint.

The adhesive of this invention not only improves the mechanical strength of the adhesive itself by gradually curing even at normal temperature, thanks to the actions of water contained in the atmosphere and of moisture moving from adhered articles after the adhesive has been used for adhesion, but also is excellent in long-term stability of adhering power because the adhering power gradually increases, due to the curing between the surface layer molecules of the adhered article and the molecules in the adhesive.

Particularly, this adhesive is useful in adhering or joining cured polyolefin articles which have conventionally been extremely difficult to join, especially cured polyolefin pipes. In this invention, the term "joining cured polyolefin articles" means adhering or joining between articles composed of cured polyolefin when one or both of the paired surfaces to be joined have the degree of cure (or crosslinking) equivalent to a gel fraction of at least 5%, preferably at least 10% (in this invention, % is always by weight) as determined according to ASTM D-2765, Method A.

For the water curable polyolefin which composes the adhesive of this invention, one may use those having hydrolizable silane radicals in its main or side chain, expressed by the general formula

where Y is a hydrolizable organic radical having less than 20 carbon atoms, and $R^1$ and $R^2$ are radical Y or a monovalent saturated organic radical having less than 20 carbon atoms. Radical Y is exemplified by alkoxy radical such as methoxy, etoxy and butoxy, acyloxy radical such as formyloxy, acetoxy and propionoxy, oximo radical such as $-ON=C(CH_3)_2$, $-ON=C(CH_3)C_2H_5$ and $-ON=C(C_6H_5)_2$, substituted amino radical such as $-NHCH_3$, $-NHC_2H_5$ and $-NH(C_6H_5)$, etc. $R^1$ and $R^2$ are, for example, methyl, ethyl, propyl, tetradecyl, octadecyl, phenyl, benzyl, tolyl, etc. or may be radical Y.

It is desirable to set the content of the above-mentioned hydrolyzable silane radical at 0.001% to 20%. That is because polyolefin with said silane radical content of less than 0.001% has low curability from water curing and therefore lacks sufficient adhesive power. On the other hand, polyolefin with said content of over 20% is not easy to handle because water curing gradually progresses during heating in the jointing operation on articles of the cured polyolefin. Therefore the preferable content of hydrolyzable silane radical is 0.05% to 5%.

In the present invention, water curable polyolefins having a melt index (MI) of 0.1 to 20 measured by ASTM D-1238 are employed. That is because any water curable polyolefin whose MI is smaller than 0.1 has too large a melting viscosity to apply to the surfaces to be joined, whereas if MI exceeds 20, it does not adhere well due to the weak mechanical strength of the adhesive itself no matter how well it is water cured. Therefore the most desirable MI ranges from 0.5 to 5.

The water curable polyolefin of this invention may be obtained by, for instance, heating a mixture of polyolefin, free radical producing compound, and unsaturated organic silane compound presented by the formula $$RR'_n SiY_{(3-n)} \quad (II)$$

(where R is a monovalent unsaturated radical having less than 20 carbon atoms directly connecting to Si atom; Y is a hydrolyzable organic radical in the same concept described in the above-mentioned formula (I); R' is a monovalent saturated radical having less than 20 carbon atoms or radical Y; and n is 0, 1 or 2) at the temperature higher than the decomposition temperature of said free radical producing compound.

Examples of the polyolefin are homopolymers and copolymers of α-olefins, such as ethylene, propylene, butene-1 and 4-methylpentene-1, homopolymers and copolymers of α-olefins containing halogens, carboxylic acids or derivatives thereof, and copolymers of α-olefins and carboxylic acids or derivatives thereof, such as polyethylene, polypropylene, polybutene-1, poly-4-methylpentene-1, ethylene-propylene copolymer, ethylene-vinyl acetate copolymer, ethylene-ethyl acrylate copolymer and chlorinated polyethylene. Examples of more preferable polyolefins are as follows.

(1) Copolymers of ethylene and at least one of α-olefins having 3 to 10 carbon atoms.

Examples of α-olefins having 3 to 10 carbon atoms and useful as one of the components of such copolymers are propylene, butene-1, pentene-1, 4-methylpentene-1 and hexene-1.

The ratio of the α-olefin in the copolymer is 0.5 to 50%, preferably 50 to 30%. If the ratio is less than 0.5%, reduced bond strength tends to result, whereas if the ratio exceeds 50%, the composition requires a higher temperature in forming thereof. This imposes a limitation on the kinds of organic peroxides usable. Especially preferable among such copolymers are those having a density of less than 0.915 g/cm³ as measured according to ASTM D-2839 since they are amenable to processing and shaping.

The copolymer may further contain in the molecule thereof at least one of nonconjugated dienes, ethylenically unsaturated carboxylic acids and acid anhydrides thereof as its third component. The presence of the third component in a small amount is effective in affording improved adhesion. However, the third component, if present in an excessive amount, conversely results in reduced bond strength, so that the content of the third component should preferably be not more than 10%.

Useful nonconjugated dienes are those used as the third component of EPDM and including, for example, methylenenorbornene, ethylidenenorbornene and like norbornenes, 1,11-tridecadiene, 11-ethyl-1,11-tridecadiene, 6-methyl-1,6-heptadiene, dicyclopentadiene, methyltetrahydroindene and like nonconjugated dienes.

Examples of useful ethylenically unsaturated carboxylic acid are those amenable to radical polymerization and represented by the formula

Wherein $R^1$, $R^2$ and $R^3$ are the same or different and are each a hydrogen atom, halogen atom, carboxyl, alkyl having 1 to 10 carbon atoms or carboxyalkyl having 1 to 10 carbon atoms, or acid anhydrides thereof. More specific examples are acrylic acid, maleic acid, itaconic acid, himic acid and acid anhydrides thereof.

(2) Polyolefins modified with an ethylenically unsaturated carboxylic acid or an acid anhydride thereof (hereinafter referred to as "modified polyolefins").

The modified polyolefins are polymers of α-olefins containing a compound represented by the formula (III) or an acid anhydride thereof as a copolymer component or graft component.

Examples of useful α-olefins are ethylene, propylene, butene-1 and 4-methylpentene-1. These compounds are used singly or in admixture in producing the polymers of α-olefins.

The ethylenically unsaturated carboxylic acid is incorporated in an amount of 0.001 to 10%, preferably 0.01 to 1%, based on the modified polyolefin. With less than 0.001% of the acid present, reduced bond strength will result, whereas if the acid content exceeds 10%, bubbles tend to occur at the interface between the adherend and the adhesive, entailing impaired bond strength.

Examples of preferred modified polyolefins are ethylene-acrylic acid copolymer (acrylic acid content: 0.01 to 1%), ethylene-maleic acid copolymer (maleic acid content: 0.01 to 1%), etc.

(3) Copolymers of an α-olefin and a carboxylic acid or an acid anhydride thereof.

Examples of such copolymers are the copolymers of (i) α-olefins, such as ethylene, propylene, butene-1 and 4-methylpentene-1, and (ii) carboxylic acids or derivatives thereof, such as vinyl acetate. Of these examples, the ethylene-vinyl acetate copolymer preferably contains 5 to 30%, most preferably 10 to 20%, of vinyl acetate.

(4) Polyethylene having a melting point (mp, °C.) and a density (d, g/cm³) which fulfill the conditions of:

$$mp \geq 500d - 345 \quad (1)$$

$$0.915 \leq d \leq 0.970 \quad (2)$$

The melting point (mp) is a value determined by the method shown in B. Ke (ed.), "Newer Methods of Polymer Characterization", chap. IX, Pages 350–354 (1964), John Wiley & Sons, Inc., N.Y. The density is a value measured according to ASTM D-2839 (20° C.) Examples of useful polyethylenes are those known as linear low-density polyethylenes and linear medium-density polyethylenes. Preferably such polyethylenes are up to 130° C. in melting point.

The free radical producing compound above-mentioned are those which, when heated at a temperature over the melting point of the polyolefin, give rise to free radicals. Examples of the compound are organic peroxides, especially dialkyl peroxides heretofore known as curing agents for polyethylenes, such as dicumyl peroxide, 2,5-dimethyl-2,5-di-(t-butylperoxy)-hexyne-3,1,3-bis-(1-butylperoxyisopropyl)benzene, 1,1-di-t-butyl-peroxy-3,3,5-trimethylcyclohexane, t-butyl-cumyl peroxide, di-t-butyl peroxide and 4,4'-di-t-butylperoxyvaleric acid n-butyl ester, hydroperoxides, such as 2,5-dimethylhexyne-2,5-di-hydroperoxide, and peroxy acids, such as t-butylperoxybenzoate, di-t-butyl-diperoxyphthalate and 2,5-di-(benzoylperoxy)hexane, or esters of such acids. Of these, dialkyl peroxides are especially preferable since they generally effect grafting described later within a shorter period of time.

In the above-mentioned formula (II) for the unsaturated organic silane compound, radical R is, for instance, vinyl, allyl, butenyl, cyclohexenyl, cyclopentadienyl, cyclohexadienyl, $CH_2=C(CH_3)COO(CH_2)_3-$, $CH_2=C(CH_3)COO(CH_2)_2O(CH_2)_3-$,

etc. Radical R' is, for example, methyl, ethyl, propyl, tetradecyl, octadecyl, phenyl, benzyl, tolyl, etc. or may be a kind of the above-mentioned radical Y.

Of the above-mentioned unsaturated organic silane compounds, the most preferable are vinyl trimethoxysilane and vinyl triethoxysilane.

To manufacture water curable polyolefin using the above-mentioned polyolefin, free radical producing compound and unsaturated organic silane compound, a compound mixed with polyolefin, 0.05 to 10 parts (in this invention, parts are always by weight), preferably 0.1 to 2 parts of the free radical producing compound and 0.001 to 20 parts, preferably 0.1 to 5 parts of the unsaturated organic silane compound, per 100 parts of the polyolefin, are heated at a temperature above the polyolefin melting temperature and for a period of time long enough for the employed free radical producing compound to fully decompose. By this heating, the unsaturated organic silane compound is grafted onto the polyolefin radicalyzed by the action of the free radical producing compound, and thus water curable polyolefin is obtained. For instance, when dicumyl peroxide is employed as free radical producing compound, and vinyl trimethoxysilane as unsaturated organic silane compound, their mixture may be held for 5 to 10 minutes at 140° to 180° C.

The reaction of the above-mentioned three components normally progresses with great ease, and polyolefin changes into water curable polyolefin in as short a period of time as just a few minutes. For that reason, the mixture composed of unchanged polyolefin, free radical producing compound and unsaturated organic silane compound may be used for the adhesive of this invention. While this mixture is held in the melting state in order to apply it on an article of cured polyolefin to be joined, the above-mentioned graft reaction goes on and the polyolefin changes into a water curable polyolefin.

Another example of the water curable polyolefin of this invention is a copolymer of α-olefin, particularly ethylene, and at least one of the unsaturated organic silane compounds represented by the above-mentioned formula (II), especially vinyl trimethoxysilane or vinyl triethoxysilane.

The process for manufacturing such a copolymer is revealed by Japan Patent Disclosure (Kokai Tokkyo Koho) No. 9611 of 1980.

The adhesive of this invention may contain a small amount, for example up to about 1 part, of a chemical that accelerates the curing by water of the water curable polyolefin, e.g. silanol condensation catalyst, per 100 parts of water curable polyolefin. As the silanol condensation catalyst, one may use tributyltin laurate, dibutyltin dilaurate, dibutyltin diacetate, or other chemicals shown in British Pat. No. 1,357,549.

However, the adhesives of this invention including the above-mentioned silanol condensation catalyst have the shortcomings that they have to be held dry because of their quick water curing, while quick action is required for bonding operation, and so on.

Therefore, the preferable adhesive in this invention should either never contain any of the chemicals considered under the criteria listed below to have a water curing accelerating effect (hereinafter such chemical is defined as high water curing accelerator) or not contain such a high water curing accelerator in excess of 0.01 part per 100 parts of the water curable polyolefin. Such adhesives are very easy to store and handle. Also, although the adhesive does not cure immediately after the bonding operation of articles, the water curing of the adhesive steadily progresses and the bonding strength gradually increases even when the bonded portion is left at room temperature.

(Criteria of Water Curing Accelerators)

A compound composed of 100 parts of polyethylene having a density of 0.925–0.930 and MI of 1–2, 0.5 part of dicumyl peroxide, 2.0 parts of vinyl trimethoxysilane and 0.1 part of sample water curing accelerator, is extruded through an extruder, which is 20–28 in L/D and is provided with a T-die, to a sheet measuring 1 mm in thickness under the extrusion temperature of 150°–170° C. and the extrusion retension time of 10–20 minutes. Then the sheet thus obtained is held in the atmosphere at 150° C. for 5 hours. After that the gel fraction of the sheet is measured according to ASTM D-2765, Method A. If the gel fraction is over 10%, it is judged as a high water curing accelerator.

Some of the silanol condensation catalysts, e.g. dibutyltin dilaurate, can be regarded as such a high water curing accelerator.

Various other chemicals, e.g. oxidation inhibitors, coloring agents, temperature sensing agents, discoloring agents, etc. may be mixed with the adhesive of this invention as long as they do not interrupt its bonding performance.

The adhesive of this invention can be handled in various forms. To handle the adhesive in its solid shape, it is desirable to mold the same beforehand into bar, sheet, tape, ring or any other adaptable form. The adhesive of this invention can also be used together with a chemically stable voltatile organic liquid as dissolved or dispersed therein.

As the above-mentioned organic liquid, chemicals with various chemical structures are utilized as long as they do not adversely affect the water curability of the water curable polyolefin. For example, one may use hydrocarbons such as benzene, toluene, xylene, durain, mesitylene, decalin, liquid olefin oligomers, and petroleum products like light oil, kerosene, naphtha, gasoline, etc.; hydrocarbons containing oxygen such as tetrahydrofuran, methylisobutylketone, cyclohexanone, diphenylether, 2-ethylhexanol, etc.; or other organic compounds such as dichlorobenzene, trichloroethylene etc. Of the volatile liquids, excessively volatile ones are hard to handle, whereas insufficiently volatile ones require a long period of time to disperse after the application of the adhesive. The preferred boiling point of the volatile liquid ranges from 100° C. to 200° C. If the water curable polyolefin is polyethylene based, or if its melting point is from 100° to 140° C., the particularly desirable organic liquid is a hydrocarbon whose boiling point is from 130° C. to 170° C., e.g. petroleum fractions such as gasoline, naphtha, etc. and xylene.

The amount of the organic liquid to be used may be freely determined. One may use a solution made by dissolving a small amount of water curable polyolefin in a large quantity of organic liquid. On the other hand, a composition made by dispersing a bit of organic liquid in the water curable polyolefin will also do. Although water curable polyolefin has high melting viscosity in general, if even a small amount of organic liquid is dispersed, it reduces the melting viscosity of the polyolefin, thus facilitating its application to the surface to be jointed. Generally the appropriate amount of the organic liquid ranges from 10 parts to 2000 parts, preferably from 200 parts to 800 parts per 100 parts of the water curable polyolefin.

Although including a great amount of high water-curing accelerator in the adhesive of this invention has the above-mentioned disadvantage, if the high water-curing accelerator and the water curable polyolefin are contained in separate vessels respectively but quickly mixed immediately before the application, then the accelerator will work perfectly. To employ the high water-curing accelerator in this fashion, each of the two components is preferably either dissolved or dispersed in said organic liquid beforehand so as to facilitate quick mixing with each other.

The adhesive of this invention is very useful as an adhesive for various articles, such as wood, materials for construction, shaped plastic articles, particularly for cured polyolefin goods like cured polyolefin pipes, because the curing progresses after the jointing operation has been finished and its jointing power increases even if it does not contain any high water curing accelerator, much more if it contains the accelerator.

To use the adhesive of this invention for joining cured polyolefin articles, especially cured polyolefin pipes, it is desirable that the adhesive has a tensile strength (So, kg/mm$^2$) in the water curable and cured state which is greater than that (S, kg/mm$^2$) of the cured polyolefin pipe to be jointed, particularly greater than (S+0.1) kg/mm$^2$.

Next the preferred joining method of cured polyolefin articles using the adhesive of this invention will be described.

Earlier, as an example of water curable polyolefin, the substance obtained from mixing polyolefin, free radical producing compound and unsaturated organic silane compound has been mentioned and so a detailed description of the polyolefin has been made. As the polyolefin articles serving as objects of joining in this invention, one may list an article comprising a cured one of a polyolefin selected from the concept of the above-mentioned polyolefin, which is cured with a curing agent such as organic peroxide, by irradiation, or by water curing, and so on. A molded article of cured polyolefin, which enables particularly good adhesion to be made, is an article comprising a water cured one of a water curable polyolefin selected from those of the same concept as the water curable polyolefin that composes the adhesive of this invention (mixed with silanol condensation catalyst or water curing accelerator as required). When a water curable polyolefin is molded with an extruder, calender, injection molding machine and other normal molding machines, the gel fraction of the polyolefin has often reached over 5% immediately after the molding, due to the effect of the heat during the molding process on the moisture originally contained in the water curable polyolefin or the polyolefin serving as its raw material and/or moisture in the atmosphere. Such molded articles right after being molded can be the object of adhesion in this invention just like objects brought to the highly cured state through the curing process after molding.

In the joining method of this invention, it is generally essential for the adhesive to be brought in the melted state on the surface of molded articles to be joined, before or after, or at the very time when the molded articles are brought into contact with each other. Then, the polyolefin molecules which compose the adhesive will better adhere the surface of the cured polyolefin article. To attain tighter and stronger joining, it is desirable to bring the adhesive to a temperature 20° C. higher, especially 50° C. higher, than the melting point (To, °C.) of the water curable polyolefin which composes the adhesive.

Such heating of the adhesive can be achieved in various ways. For example, there are (1) a method in which the surface of a cured polyolefin article to be joined is heated in advance at a required high temperature and then the adhesive at normal temperature is applied to the surface, (2) a method in which the adhesive heated in advance at a required high temperature is applied to a molded article's surface kept at normal temperature, (3) a method in which the adhesive at normal or high temperature is applied to a molded article's surface kept at normal or high temperature and then the adhesive on the molded article's surface (preferably together with the molded article's surface at the same time) is heated by a metal heater 4 shown in FIG. 2, a hot plate, a torch lamp, or by any other proper means, and so forth.

Hereinafter the method of this invention will be explained by examples of joining cured polyolefin pipes.

Figure 2:
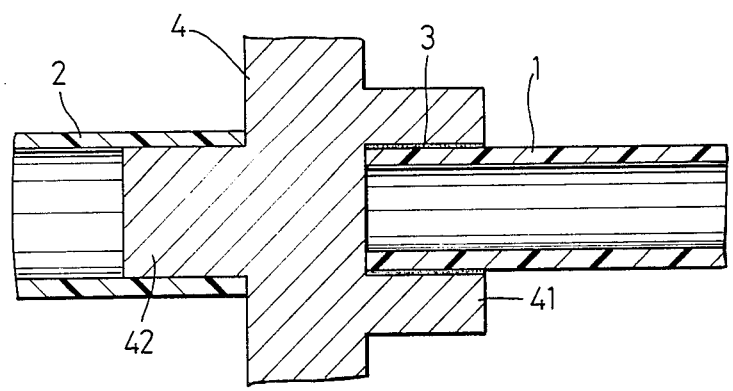
Figure 3:
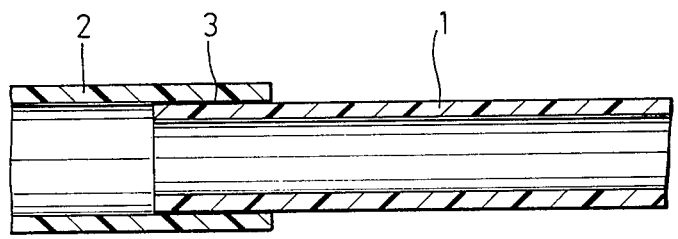

In FIGS. 1 to 3, first the adhesive of this invention is applied to the end surface of a pipe 1 made of cured polyolefin. Then, using a metal heater 4 having a ring-shaped projection 41 whose inside diameter is equal to the pipe's outside diameter or slightly larger than that and a column-shaped projection 42 whose outside diameter is equal to the inside diameter of a joint 2 made of cured polyolefin or slightly larger than that, the end of pipe 1 is inserted into the projection 41 and joint 2 into projection 42 as shown in FIG. 2, and all are heated.

Next, pipe 1 and joint 2 are separated from the metal heater, and while adhesive 3 on pipe 1 is still in the melted state, pipe 1 is quickly inserted into joint 2 as shown in FIG. 3. Thus the connection of pipe 1 to joint 2 is completed. The adhesive may be applied either only to the inside of the joint or preferably to both articles to be bonded. Joint 2 is a socket, elbow, cheese, etc. If the inside diameter of joint 2 before being heated is smaller than the outside diameter of pipe 1, the inside diameter of joint 2 is expanded by heating and then jointed to pipe 1 for tighter connection.

If the inside diameter of the ring-shaped projection 41 of the metal heater is equal to or only slightly larger than the outside diameter of pipe 1, only a very thin film of adhesive remains on the surface at the end of pipe 1, because most of the adhesive is pushed back in the pipe by inserting the pipe 1 into the said projection 41. In the method of this invention, however, if, immediately before the pipe is inserted into the joint, a very thin film of the adhesive of this invention in the melted state is present, then adequate connection can be achieved.

To use the adhesive of this invention in solid shapes such as bar, sheet, etc. at normal temperature, it may be applied to the pipe surface or the like while the adhesive is being melted by a heating means, such as gas burner. Also when the aforementioned organic liquid is added to the adhesive of this invention and is used as a low-viscosity liquid at normal or high temperature, it can be easily applied with brush or the like not only to the outer surface of the pipe but also to the inner surface of the joint. When an organic liquid is employed, it is desirable that the remaining amount of organic liquid in adhesive 3 is minimized right before pipe 1 is inserted into joint 2, but a slight amount may be allowed to remain.

Actually, however, there is no problem about the use of organic liquid in the jointing method of this invention because most of the organic liquid is dispersed thanks to its own volatility and by being heated to a high temperature at which the adhesive of this invention is melted.

In the perferred mode of joining pipes using joints, prior to the application of the adhesive the surface of the pipe and/or joint to which the adhesive is to be applied are preheated at least to the melting point ($T_o$), preferably at least to ($T_o+20$)°C., of the water curable polyolefin that composes the adhesive.

The higher the above-mentioned preheating temperature, the better the joining power of the adhesive. However, since excessive heating might cause heat deformation of the pipe and/or the joint, it is desirable to set the temperature at over ($T_o+50$)°C. and under ($T_o+180$)°C. If the adhesive, the pipe, and the joint are each composed of different materials, it is preferable to preheat them to a temperature higher than the highest melting point of all the materials.

Although the preheating may be conducted in any manner, the most desirable method is such that, of the whole thickness of the zone to be joined, only the surface and the upper half of the thickness, preferably only the surface and about the upper tenth of the thickness are heated to the above-mentioned high temperature. That is because heat deformation is inevitable on the pipe and joint if the whole layers of the pipe and joint become as hot as the said temperature. Such heating can be achieved by bringing the pipe and joint for the period of from several seconds to several minutes into direct contact with a metal heater held at a temperature as high as 200°-300° C., for example.

After the preheating process, and while the surface of the preheated pipe and/or joint keeps the temperature at least $T_o$°C., the adhesive is applied. As long as the adhesive is applied all over the surface to be joined, a thickness of about 0.5 mm is sufficient for the amount of applied adhesive.

Immediately before inserting the pipe into the joint, both of the surfaces of the pipe and joint are heated at least to ($T_o+20$)°C., even if adhesive is not applied to either one of the two members and whether preheating of pipe, joint, and/or adhesive is conducted or not. The heating is particularly preferable to smoothly insert the pipe in the subsequent step and to maintain sufficient joining strength at the interface between pipe and joint after insertion.

As the temperature of the heating is raised, the insertion becomes easier and smoother due to the drop in the melt viscosity of the adhesive, and the adhesion strength after insertion improves accordingly. However, excessive heating is likely to worsen the mechanical strength of either or both of the pipe to be inserted and the joint to receive it, resulting in obstructed and unsmooth insertion. For that reason, it is essential to heat only the surface of the jointing zone or its vicinity at a high enough temperature. It is desirable to quickly heat the surfaces of the joining zone to a temperature over ($T_o+50$)°C. but under ($T_o+180$)°C., particularly at over ($T_o+80$)°C. but under ($T_o+140$)°C., using metal heater 4 or the like.

The preferred time required for the heating using metal heater 4 shown in FIG. 2, depends on the thickness (A mm) and outside diameter (D mm) of the pipe and the joint respectively. If the joint heating time is $t_1$ sec., the pipe heating time $t_2$ sec., they are expressed as follows:

$$t_1 = \frac{\alpha(AD + 100)}{T - 200} \times 40$$

$$t_2 = \frac{\alpha(AD + 40)}{T - 200} \times 40$$

where $\alpha$ is a constant and is from 0.01 to 0.05 and T is the temperature (°C.) of the metal heater. Also it is desirable to make $t_1 > t_2$, particularly $t_1$ ranging from $1.1t_2$ to $3t_2$.

After the above-mentioned heating is finished, it is desirable to insert the pipe into the joint as soon as possible, especially desirable to do it within 10 seconds right after the heating. Generally the deeper the insertion of pipe 1 into joint 2, the greater the strength of joining, however the insertion resistance increases according to the increase in the length of the inserted portion of the pipe. The proper length of the inserted portion is about 0.5-2 times the pipe's outside diameter. So when the pipe has been inserted to that extent and has reached the point where the insertion resistance has risen abruptly, it is desirable to stop inserting and cool the pipe and joint without changing their relative positions so that the jointed interface between the pipe and the joint may not be damaged. Then the adhesion strength will become more stable.

Although it depends on the size of the pipe and joint, it is generally desirable to stop inserting after pressing and inserting the pipe for 2-20 sec. following the start of insertion, and keep the joined zone immobile as mentioned above to cool it.

Cured polyolefin pipes can be firmly joined by the butt method, without using any joint. Hereinafter some examples of pipe connection by the butt method will be described.

The ends of two pipes to be joined are correctly cut in advance so as to minimize the clearance which might be caused when the two ends are put in contact. Then adhesive of this invention is interposed between the two ends, and while the adhesive is in the melted state, the two pipes are lightly pressed against each other. The adhesive will do either in the solid shape of sheet, etc. at normal temperature, or in the shape of paste added with organic liquid at normal or high temperatures. By pressing the pipes against each other the adhesive between the pipe ends is turned into a layer as thin as less than 1 mm, sometimes even under 0.1 mm, but this causes no problem as far as the strength of the pipe connection is concerned.

Prior to joining pipes in the butt method, it is desirable to preheat at least the ends of the pipes to a temperature higher than the melting point ($T_o$) of the adhesive, and preheat the adhesive to a temperature higher than ($T_o-40$)°C., preferably higher than $T_o$°C. The pipes can be firmly joined by doing so. In some case, the adhesive may be separately heated apart from the ends of the pipes and interposed between the ends of the pipes. However, in order to obtain a more stable high jointing strength, it is more desirable to keep the adhesive in contact with at least one of the pipes to be jointed and preheat it together with the ends of the pipes.

The present invention will be described in greater detail with reference to the following examples and comparison examples.

EXAMPLES 1-24, COMPARISON EXAMPLES 1-3

Prepared for these examples were pipes of cured polyolefins listed in Table 1 and measuring 21 mm in inside diameter and 27 mm in outside diameter, and socket joints of cured polyolefins listed in Table 1 and measuring 27 mm in inside diameter, 34 mm in outside diameter, and 7.5 cm in length. Grease and water were removed from the outer surfaces of the spigot ends of the pipes and the inner surfaces of the socket ends of the joints with dry cloth. An adhesive comprising a polyolefin composition listed in Table 1 was applied to the outer surface of the pipe spigot end about 1 mm in thickness and about 4 cm in length.

The outer surface of the pipe spigot end and the inner surface of the socket joint end were heated for about 20 seconds by using an electrically heated iron heater maintained at a temperature of 220° C., which was the type shown in FIG. 2 and had a cylinder-shaped projection of 27 mm in outside diameter and 5 cm in length and a ring-shaped projection of 27 mm in inside diameter and 5 cm in length. After this the pipe was inserted into one socket end of the joint. The same procedure was repeated for the other socket end of the joint.

Each adhesive used in Examples 1-13, and 17-24 were prepared by mixing and extruding a composition consisting of 100 parts of the base polymer listed in Table 1, 0.2 part of dicumyl peroxide and 2 parts of vinyl trimethoxysilane through a mixtruder held at a temperature of about 150° C. Each adhesive used in each of Examples and Comparison Examples were mixed with each organic solvent listed in Table 1 at a temperature of around 100°-150° C. and applied.

Comparison Example 1 and Comparison Example 2 were different from Example 1 and Example 2 respectively in only the point that each adhesive used was not water curable. In Comparison Example 3 the jointing operation of Example 14 was conducted with the exception of using no adhesive. In this case, the pipe and the socket joint are joined by the action of heat fusion.

WATER PRESSURE TEST

An approximately 30 cm long specimen including the socket joint portion at its midportion was ruptured by increasing the pressure of the water (20° C.) filled in the specimen at a rate of 20 kg/cm$^2$ per minute. Table 1 shows two pressure values at which the specimen ruptured, one indicating the initial value which was obtained from the test conducted 2 hours after the end of pipe joining, the other indicating the value after heat-cycles of 1 month, in which the specimen was heated at 80° C. for 12 hours and then cooled at 25° C. for 12 hours.

For the interpretations of abbreviations representing the names of materials and chemicals listed in Tables 1 and 2, see the remarks in Table 5.

TABLE 1

| Example No. | | 1 | 2 | 3 | 4 | 5 | 6 | 7 | 8 | 9 | 10 | 11 |
|---|---|---|---|---|---|---|---|---|---|---|---|---|
| Pipe | Material (Parts) | PE (d: 0.945, MI: 0.8) 100 | PE (d: 0.945, MI: 0.8) 100 | PE (d: 0.945, MI: 0.8) 100 | PE (d: 0.945, MI: 0.8) 100 | PE (d: 0.935, MI: 0.8) 100 | PE (d: 0.945, MI: 0.8) 100 | PE (d: 0.945, MI: 0.8) 100 | PE (d: 0.935, MI: 0.5) 100 | PE (d: 0.935, MI: 0.5) 100 | PE (d: 0.935, MI: 0.5) 100 | PE (d: 0.935, MI: 0.5) 100 |
| | | DCP 2.2 | DCP 2.2 | DCP 2.2 | DCP 2.2 | DCP 2.2 | DCP 2.2 | DCP 2.2 | VMS 2.0 DCP 0.2 BTL 0.05 | VMS 2.0 DCP 0.2 BTL 0.05 | VMS 2.0 DCP 0.2 BTL 0.05 | VMS 2.0 DCP 0.2 BTL 0.05 |
| | Gel fraction (%) | 73 | 73 | 73 | 73 | 82 | 82 | 82 | 73 | 73 | 73 | 73 |
| Joint | Material (Parts) | PE (d: 0.945, MI: 0.8) 100 VMS 2.0 DCP 0.2 BTL 0.05 | PE (d: 0.945, MI: 0.8) 100 VMS 2.0 DCP 0.2 BTL 0.05 | PE (d: 0.945, MI: 0.8) 100 VMS 2.0 DCP 0.2 BTL 0.05 | PE (d: 0.945, MI: 0.8) 100 VMS 2.0 DCP 0.2 BTL 0.05 | PE (d: 0.945, MI: 0.8) 100 DCP | PE (d: 0.945, MI: 0.8) 100 VMS 1.5 DCP 0.2 BTL 0.05 | PE (d: 0.945, MI: 0.8) 100 VMS 2.0 DCP 0.2 BTL 0.05 | PE (d: 0.945, MI: 0.8) 100 VMS 2.0 DCP 0.2 BTL 0.05 | PE (d: 0.935, MI: 5) 100 VMS 2.0 DCP 0.2 BTL 0.05 | PE (d: 0.92, MI: 2.0) 100 TAIC 6.0 DCP 0.25 BTL 0.05 | PP (d: 0.91, MI: 0.5) 100 TMPAF 3 |
| | Gel fraction (%) | 82 | 73 | 73 | 73 | 67 | 73 | 73 | 73 | 73 | 20 | 35 |
| Adhesive (Parts) | Base polymer (100 parts) | EB (d: 0.88, MI: 3.2, B: 5%) | EH (d: 0.88, MI: 0.5, H: 10%) | LPE (d: 0.925, mp: 119° C., MI: 2) | LPE (d: 0.935, mp: 123° C., MI: 0.8) | EM (d: 0.93, MI: 4, M: 0.2%) | EAC (d: 0.91, MI: 13, A: 0.4%) | EVA (d: 0.93, MI: 3.0, VA: 10%) | EEA (d: 0.93, MI: 0.8, EA: 8%) | PE (d: 0.920, MI: 2.0) 40 EPDM 60 | EVA (d: 0.93, MI: 1.5, VA: 10%) 80 EB (d: 0.89, MI: 4, B: 5%) 20 | PE-M 50 EE-A (d: 0.93, MI: 1.5, EA: 0.4%) 50 |
| Water pressure (kg/cm²) | Solvent, (parts) | Xylene, 400 | Tetradecane, 400 | Decalin, 400 | Decalin, 400 | Decalin, 400 | Decalin, 400 | Xylene, 400 | Xylene, 400 | Xylene, 500 | Xylene, 500 | Xylene, 500 |
| | Initial | ≧56 (note 1) | ≧56 (note 1) | ≧56 (note 1) | ≧56 (note 1) | ≧56 (note 1) | ≧56 (note 1) | ≧56 (note 1) | ≧56 (note 1) | ≧56 (note 1) | ≧56 (note 1) | ≧56 (note 1) |
| | After heat cycle | ≧56 (note 1) | ≧56 (note 1) | ≧56 (note 1) | ≧56 (note 1) | ≧56 (note 1) | ≧56 (note 1) | ≧56 (note 1) | ≧56 (note 1) | ≧56 (note 1) | ≧56 (note 1) | ≧56 (note 1) |

| Example No. | | 12 | 13 | 14 | 15 | 16 | 17 | 18 | 19 | 20 | 21 | 22 |
|---|---|---|---|---|---|---|---|---|---|---|---|---|
| Pipe | Material (Parts) | PE (d: 0.935, MI: 0.5) 100 VMS 2.0 DCP 0.2 BTL 0.05 | PE (d: 0.935, MI: 0.5) 100 VMS 2.0 DCP 0.2 BTL 0.05 | PE (d: 0.935, MI: 0.5) 100 VMS 2.0 DCP 0.2 BTL 0.05 | PE (d: 0.935, MI: 0.5) 100 VMS 2.0 DCP 0.2 BTL 0.05 | PE (d: 0.935, MI: 0.5) 100 VMS 2.0 DCP 0.2 BTL 0.05 | PE (d: 0.935, MI: 0.5) 100 VMS 2.0 DCP 0.2 BTL 0.05 | PE (d: 0.935, MI: 0.5) 100 VMS 2.0 DCP 0.2 BTL 0.05 | PE (d: 0.935, MI: 0.5) 100 VMS 2.0 DCP 0.2 BTL 0.05 | PE (d: 0.935, MI: 0.5) 100 VMS 2.0 DCP 0.2 BTL 0.05 | PE (d: 0.935, MI: 0.5) 100 VMS 2.0 DCP 0.2 BTL 0.05 | PE (d: 0.935) 100 VMS 2.0 DCP 0.2 BTL 0.05 |
| | Gel fraction (%) | 73 | 73 | 12 | 20 | 30 | 81 | 73 | 73 | 73 | 73 | 73 |
| Joint | Material (Parts) | XEP - 1 | XPECI - 1 | ES (MI: 0.5, VMS: 4%) | ES (MI: 2, VMS: 5%) | PE (d: 0.935, MI: 0.5) 35 VMS 2.0 DCP 0.2 BTL 0.05 | EGM (d: 0.93) DCP | LPE (d: 0.935, mp: 123, MI: 0.8) VMS 0.2 | EGA (d: 0.91, MI: 13, A: 0.4%) | PE (d: 0.935, MI: 0.5) VMS 2.0 DCP 0.2 BTL 0.05 | PE (d: 0.935, MI: 0.5) VMS 2.0 DCP 0.2 BTL 0.05 | PE (d: 0.935, MI: 0.5) VMS 2.0 DCP 0.2 BTL 0.05 |
| | Gel fraction (%) | 78 | 81 | 23 | | 35 | | | | | | |
| Adhesive (Parts) | Base polymer (100 parts) | EVA (d: 0.93, MI: 0.8, VA: 15%) | EVA (d: 0.93, MI: 0.8, VA: 15%) | | | | | | | EB (d: 0.89, MI: 4) 50 EPDM 50 | EEA (d: 0.93, MI: 0.8, EA: 8%) | PE (d: 0.935, MI: 0.5) 100 VMS 2.0 DCP 0.2 BTL 0.05 |
| Water pressure | Solvent, (parts) | Xylene, 800 | Xylene, 800 | Xylene, 800 | Xylene, 800 | Xylene, 800 | Tetradecane, 800 | — | — | — | — | — |
| | Initial | ≧56 (note 1) | ≧56 (note 1) | ≧56 (note 1) | ≧56 (note 1) | ≧56 (note 1) | ≧56 (note 1) | ≧56 (note 1) | ≧56 (note 1) | ≧56 (note 1) | ≧56 (note 1) | ≧56 (note 1) |
| | After heat | ≧56 (note 1) | ≧56 (note 1) | ≧56 (note 1) | ≧56 (note 1) | ≧56 (note 1) | ≧56 (note 1) | ≧56 (note 1) | ≧56 (note 1) | ≧56 (note 1) | ≧56 (note 1) | ≧56 (note 1) |

TABLE 1-continued

| | | Example No. | 23 | 24 | 1 | 2 | 3 |
|---|---|---|---|---|---|---|---|
| Pipe | Material (Parts) | | PE (d: 0.945, MI: 0.88) 100<br>VMS 2.0<br>VMS 0.2<br>DCP 0.2<br>BTL 0.05 | PE (d: 0.945, MI: 0.88) 100<br>VMS 2.0<br>DCP 0.2<br>BTL 0.05 | PE (d: 0.945, MI: 0.8) 100<br>DCP 2.2 | PE (d: 0.945, MI: 0.8) 100<br>DCP 2.2 | PE (d: 0.935, MI: 0.5) 100<br>VMS 2.0<br>DCP 0.2<br>BTL 0.05 |
| | Gel fraction (%) | | 73 | 10 | 82 | 82 | 10 |
| Joint | Material (Parts) | | PE (d: 0.935, MI: 0.5) 100<br>VMS 2.0<br>DCP 0.2<br>BTL 0.05 | PE (d: 0.935, MI: 0.5) 100<br>VMS 2.0<br>DCP 0.2<br>BTL 0.05 | PE (d: 0.945, MI: 0.8) 100<br>VMS 2.0<br>DCP 0.2<br>BTL 0.05 | PE (d: 0.945, MI: 0.8) 100<br>VMS 2.0<br>DCP 0.2<br>BTL 0.05 | PE (d: 0.935, MI: 0.5) 100<br>VMS 2.0<br>DCP 0.2<br>BTL 0.05 |
| | Gel fraction (%) | | 73 | 10 | 73 | 73 | 12 |
| Adhesive (Parts) | Base polymer (100 Parts) | | | | EB (d: 0.88, MI: 3.2, B: 5%) (not water-curable) | LPE (d: 0.925, mp: 119° C., MI: 0.8) (not water-curable) | — |
| | Solvent, (parts) | | Tetradecane, 500 | Tetradecane, 500 | Xylene, 400 | Decalin, 400 | — |
| Water pressure (kg/cm²) | Initial | | ≧56 (note 1) | ≧56 (note 1) | ≧56 (note 1) | ≧56 (note 1) | ≧56, (note 2) |
| | After heat cycle | | 22 | 24 | 22 | 24 | 10 |

(note 1): ruptured at pipe portion
(note 2): ruptured at joint portion

EXAMPLES 25-31

The composition of an adhesive used in each example, the results of the water pressure test conducted on the water cured polyethylene pipe connected by the procedure described below were shown in Table 2.

PROCEDURE OF JOINING PIPES

Both surfaces, to be joined mutually, of a cured polyethylene pipe measuring 26 mm in outside diameter and 3 mm in thickness and a water cured polyethylene socket joint measuring 26 mm in inside diameter and 3.5 mm in thickness were heated at 230° C., and then an adhesive held at 113°–150° C. was applied thinly on both the surfaces. After the surfaces were heated again at 230° C., the pipe was inserted into the socket joint in about 15 mm insertion length, and thus the connected portion was cooled with air.

WATER PRESSURE TEST (1) Short time test

The pressure of water, maintained at 80° C., filling an approximately 50 cm long specimen including the socket joint portion was progressively increased at a rate of 20 kg/cm$^2$/min. to rupture the specimen, and the pressure when the specimen ruptures was determined.

(2) Long time test

The water filling a specimen prepared in the same manner as above was maintained at 14 kg/cm$^2$ and at 80° C., and the time when water leakage did start from the joint portion was determined.

preheating the surfaces, and then the surfaces were heated by using a heater held at a temperature of 150° C. for 20 seconds for the surface of the pipe, while for 40 seconds for the surface of the socket joint in the same manner as shown in FIG. 2. After the heating, the pipe was inserted into the socket joint for about 60 mm in insertion length, while the insertion of pipe took 4 seconds. The connected portion was allowed to cool under a careful management wherein the connected interface of the pipe and the joint was maintained stationary.

Ten specimens, each of which includes the socket joint, thus obtained were subjected to the test described below.

Although water-leakage was found in 5 specimens, there was no water-leakage in the remaining 5 specimens.

WATER-LEAKAGE TEST

Water at 80° C. and 10 kg/cm$^2$ was filled in the specimen for 170 hours, thereafter it was inspected whether or not the water would leak from the connected portion of the specimen.

EXAMPLE 33

The joining operations of Example 32 were repeated except that the surfaces of the pipe and the socket joint were heated at 240° C. for 20 seconds, and after the adhesive was applied to the surfaces, the pipe was heated at 240° C. for 20 seconds, while the socket joint was heated at 240° C. for 40 seconds.

TABLE 2

| | Example No. | 25 | 26 | 27 | 28 | 29 | 30 | 31 |
|---|---|---|---|---|---|---|---|---|
| Adhesive (Parts) | LPE (d: 0.92, MI: 2.5, mp: 124° C.) | 100 | — | — | — | 100 | 100 | 100 |
| | PE (d: 0.95, MI: 5) | — | 100 | — | — | — | — | — |
| | PE (d: 0.92, MI: 1.5) | — | — | 100 | — | — | — | — |
| | ES | — | — | — | 100 | — | — | — |
| | VMS | 2.0 | 2.0 | 2.0 | — | 2.0 | 2.0 | 2.0 |
| | DCP | 0.1 | 0.1 | 0.1 | — | 0.1 | 0.1 | 0.1 |
| | BTL | — | — | — | — | — | — | 0.05 |
| | PF-1 | — | — | — | — | 500 | — | — |
| | PF-2 | — | — | — | — | — | 500 | — |
| | Xylene | 500 | 300 | 1000 | 500 | — | — | 500 |
| Temperature of Adhesive, when applied (°C.) | | 150 | 130 | 135 | 130 | 130 | 130 | 130 |
| Handling of Adhesive | | good | good | good | good | good | good | good |
| Water pressure test | Short time test Water pressure (kg/mm$^2$) | 20 | 20 | 20 | 20 | 20 | 20 | 20 |
| | Long time test Time (hr.) | >120 | >120 | >120 | >120 | >120 | >120 | >120 |

EXAMPLE 32

A compound consisting of 100 parts of polyethylene (d: 0.95 g/cm$^2$), 0.15 part of dicumyl peroxide, 2 parts of vinyl trimothoxysilane, and 0.05 part of dibutyltin dilaulate was extruded at a temperature of 170° C. to prepare a pipe measuring 60 mm in outside diameter and 4.5 mm in thickness. The same compound as above was injected to prepare a socket joint measuring 60 mm in length of pipe-insertion portion, 60 mm in inside diameter and 5.0 mm in thickness. To prepare an adhesive, 20 parts of a compound consisting of 100 parts of polyethylene (d: 0.95 g/cm$^2$, mp: 130° C.), 0.15 part of dicumyl peroxide and 2 parts of vinyl trimethoxysilane was heat-dissolved in 100 parts of xylene. At the time of pipe joining, the gel fractions of the polyethylenes constructing the pipe, the socket joint and the adhesive were 20%, 15%, and a value lower than 1%, respectively.

The adhesive was applied to the surfaces of connection portions of the pipe and the socket joint without

EXAMPLE 34

The joining operations of Example 33 were repeated except that in advance of joining operation the pipe and the socket joint were immersed in hot water held at a temperature of 80° C. for 43 hours to be further water-cured.

The polyolefin constructing the pipe and the socket joint had a gel fraction of 50% and 48% respectively, when the joining operation had started.

EXAMPLE 35

The joining operations of Example 33 were repeated with the exceptions of preheating (220° C., 20 seconds) and heating after the application of adhesive (pipe: 220° C., 30 sec.; socket joint: 220° C., 60 sec.).

EXAMPLE 36

The joining operations of Example 33 were repeated with the exception of using an adhesive which was prepared by dissolving 20 parts of a compound consisting of a linear polyethylene (d: 0.92 g/cm$^2$, MI: 12.5 g/10 min., mp: 120° C.) 100 parts, vinyl trimethoxysilane 2.0 parts and dicumyl peroxide 1 part to 100 parts of decalin.

The same water-leakage tests as described in Example 32 were conducted on the specimens of Examples 33–36. No water-leakage was found on 10 specimens of each example.

EXAMPLE 37

By extruding (in the case of a pipe) or injecting (in the case of a socket joint) and heat-curing of a compound consisting of 100 parts of polyethylene (d: 0.945 g/cm$^3$), 2.0 parts of dicumyl peroxide, 0.3 part of 2,6-t-butylmethylphenol and 0.8 part of carbon black, was a pipe prepared having an outside diameter of 27.0 mm, a thickness of 3.0 mm, and a socket joint having an inside diameter of 27.0 mm and a thickness of 3.5 mm. The cured polyethylene of the pipe and the socket joint had a gel fraction of 80%, and a tensile strength of 2.3 kg/mm$^2$.

A water-curable film to be used as adhesive, having a thickness of 0.2 mm and a tensile strength of 2.6 kg/mm$^2$, was made of a compound consisting of polyethylene (d: 0.956 g/cm$^3$, MI: 0.8 g/10 min) 100 parts, vinyl trimethoxysilane 2.0 parts and dicumyl peroxide 0.2 part.

The joining portions of the pipe and the socket joint were cleaned, covered with the adhesive film, and heated by using an iron heater held at a temperature of 200° C., and then the pipe was inserted to the socket joint.

EXAMPLE 38

The joining operations of Example 37 were repeated with the exception of using a water curable polyethylene film having a density of 0.943 g/cm$^2$ and a tensile strength of 2.0 kg/mm$^2$.

EXAMPLE 39

A compound consisting of polyethylene 100 parts, vinyl trimethoxysilane 2.0 parts, dicumyl peroxide 0.2 part, dibutyltin dilaurate 0.05 part, 2.6-t-butylmethylphenol 0.3 part and carbon black 0.8 part was used to prepare a pipe (outside diameter: 48.0 mm, thickness: 4.5 mm, gel fraction: 30%, and tensile strength: 2.5 kg/mm$^2$) and a socket joint (inside diameter: 48.0 mm, thickness: 5.0 mm, gel fraction: 30%, tensile strength: 2.5 kg/mm$^2$).

The joining operations of Example 37 were repeated with the exception of using the above pipe and socket joint, and a pasty adhesive prepared by dissolving 1 part of a water curable polyethylene of silane graft type having a tensile strength of 2.8 kg/mm$^2$ to 5 parts of xylene.

EXAMPLE 40

As an adhesive, a water curable polyethylene of silane graft type having a density of 0.952 g/cm$^3$, and a tensile strength of 2.3 kg/mm$^2$ instead of the adhesive used in Example 39 was used to repeat the joining operations of Example 39.

EXAMPLE 41

A water cured polyethylene pipe (outside diameter: 48 mm, thickness: 4.5 mm, gel fraction 30%, and tensile strength: 2.7 kg/mm$^2$) is joined to a water cured polyethylene socket joint (inside diameter: 48 mm, thickness: 5.0 mm, gel fraction: 30%, and tensile strength: 2.7 kg/mm$^2$) using a pasty adhesive which was prepared by dissolving 1 part of a water curable polyethylene (tensile strength: 3.2 kg/mm$^2$) to 5 parts of xylene in the same manner as described in Example 37.

EXAMPLE 42

A water cured polyethylene pipe (outside diameter: 60 mm, thickness: 5.5 mm, gel fraction: 30%, tensile strength: 2.5 kg/mm$^2$) was joined to a water cured polyethylene socket joint (inside diameter: 60 mm, thickness: 6.0 mm, gel fraction: 30%, tensile strength: 2.5 kg/mm$^2$) by using a pasty adhesive which was prepared by dissolving 1 part of a water-curable polyethylene (tensile strength: 3.5 kg/mm$^2$) to 5 parts of xylene in the same manner as described in Example 37.

CREEP TEST

Three specimens, each of which included the socket joint portion, were subjected to the Creep Test of JIS K 6774, Section 6.10 at 80° C. for 1500 hours. Of the 3 specimens of Example 38, two specimens developed a leak from the joint portion after a 800 hours lapse (one specimen) and a 1200 hours lapse (the other). The remaining one specimen had stood for 1500 hours without any water leak. Of the 3 specimens of Example 40, one specimen developed a leak after a 1200 hours lapse, and the remaining two had stood for 1500 hours without any leak. While 3 specimens from each example of Example 37, 39, 41 and 42 had stood for 1500 hours without any leak.

EXAMPLES 43–45

A polyethylene, 0.92 g/cm$^3$ in density, and 1.1 g/10 min in MI was extruded and heat-cured with use of dicumyl peroxide to obtain two pipes each having an outside diameter of 91 mm and a thickness of 5 mm and made of cured polyethylene having a gel fraction of 65%. The pipes were cut to form end faces perpendicular to the pipe axis and fittable to each other for joining.

Each end face of the pipes was contacted by a hot plate held at a temperature of 235° C. for several minutes to heat to a desired temperature. While, a film of adhesive, having a thickness of 2 mm, made of a water curable polethylene (d: 0.925 g/cm$^3$, mp: 120° C.) grafted with vinyl trimethoxysilane with the aid of dicumyl peroxide was put onto an above-mentioned hot plate to heat melt. At the time when the film as heated at a temperature over its melting point (heating for about 60 seconds), the film was pressed by the end face of one pipe preheated, and then the end face covered with the adhesive was pressed by the end face of the other pipe also preheated to join each other.

Temperatures at which the end faces of the pipes were preheated before the butt joint operation and the results of the water pressure test (rate of increasing water pressure: 20 kg/cm$^2$/min., water temperature: 20° C.) were listed in Table 3.

TABLE 3

| Example No. | | 43 | 44 | 45 |
| --- | --- | --- | --- | --- |
| Temperature of end faces (°C.) | | 160 | 200 | 240 |
| Water Pressure Test | Strength against Water Pressure (kg/cm$^2$) | 27 | 28 | 26 |
| | Broken Portion | pipe (not joint) | " | " |

TABLE 3-continued

| Example No. | 43 | 44 | 45 |
|---|---|---|---|
| | | portion) | |

EXAMPLES 46-47, COMPARISON EXAMPLE 4

Two wooden pieces each measuring 5 mm in thickness, 10 cm in length and 2 cm in width were heated at a temperature of 130° C. for 1 hour, and an adhesive held at a temperature of 140° C. was applied to both of the surfaces of the pieces. Thereafter each half length of the pieces were mutually superposed to press and bond by the action of adhesive.

Adhesives used and force necessary to peel off determined according to peel off test described below were listed in Table 4.

TABLE 4

| | | Example 46 | Example 47 | Comparison Example 4 |
|---|---|---|---|---|
| Adhesive | | Same as Ex. 4 | Same as Ex. 3 | Same as Com. Ex. 2 |
| Force necessary to Peel Off (kg) | Initial | 30 | 30 | 30 |
| | After heat cycle | 50 | 45 | 10 |

PEEL OFF TEST

Force necessary to peel off is tensile strength (kg) at which a bonded wooden specimen subjected to tensile test separates into two pieces. Table 4 shows two values. One is the initial value which was obtained on a specimen taken after a 2 hours lapse of bonding operation. The other is the value after heat-cycles of 1 month, in which the specimen was heated at 80° C. for 12 hours and then cooled at 25° C. for 12 hours.

TABLE 5-1

| A | Acrylic acid |
|---|---|
| B | Butene-1 |
| BTL | Dibutyltin dilaulate |
| DCP | Dicumyl peroxide |
| EA | Ethyl acrylate |
| EAC | Ethylene-acrylic acid copolymer |
| EB | Ethylene-butene-1 copolymer |
| EEA | Ethylene-ethyl acrylate copolymer |
| EGA | Acrylic acid grafted PE |
| EGM | Maleic acid grafted PE |
| EH | Ethylene-hexen-1 copolymer |
| EM | Ethylene-maleic acid copolymer (maleic acid: 1%, d: 0.92 g/cm$^3$, MI:3.5 g/10 min.) |
| EPDM | Ethylene-propylene-dieneterpolymer (MI: 1.0) |
| ES | Water curable ethylene-silane copolymer |
| EVA | Ethylene-vinyl acetate copolymer |
| H | Hexen-1 |
| LPE | Linear polyethylene |
| M | Maleic acid |
| PE | Polyethylene |
| PE-A | Acrylic acid grafted PE (acrylic acid: 0.4%, d:0.91 g/cm$^3$, MI:13 g/10 min.) |
| PE-M | Maleic acid grafted PE (maleic acid: 0.2%, 0.93 g/cm$^3$, MI:4 g/10 min.) |
| PECl | Chlorinated PE |
| PF-1 | Petroleum fraction (BP: 130–140° C.) |
| PF-2 | Petroleum fraction (BP: 140–150° C.) |
| PP | Polypropylene |
| TAIC | Triallylisocyanurate |
| TMPAF | 3-Trimethoxysilyl propylazido formate |
| VA | Vinyl acetate |
| VMS | Vinyl trimethoxysilane |

TABLE 5-2

| XEP-1 | Cured EPDM compound: | |
|---|---|---|
| | EPDM (d: 0.87 g/cm$^3$, Moony viscosity/ML$_{1+4}$, 100° C./:20, diene: dicyclopentadine) | 100 parts |
| | ZnO | 5 parts |
| | Stearic acid | 1 part |
| | HAF carbon | 55 parts |
| | Naphthene oil | 10 parts |
| | Sulfur | 1 part |
| | 2-Mercaptobenzothiazole | 0.5 part |
| | Tetramethylthiuram monosulfide | 1.5 parts |
| XPECl-1 | Cured flame-resisting PECl compound: | |
| | PECl (Cl: 32%, d:1.15 g/cm$^3$, MI: 0.4 g/10 min.) | 100 parts |
| | Sb$_2$O$_3$ | 10 parts |
| | Tribasic lead sulfide | 1.5 parts |
| | DCP | 3.5 parts |

What is claimed is:

1. A method for joining polyolefin piping elements at least one of whose surfaces to be joined have a gel fraction of at least 20% by weight, which comprises applying an adhesive comprising a water curable polyolefin having a melt index of 0.1 to 20 to one or both of the above surfaces, said adhesive being applied in a melted state, and placing both of the surfaces in contact with each other and water curing the adhesive to obtain a bond which will withstand an internal water pressure which is at least as high as the rupture pressure of the polyolefin piping element.

2. A method of claim 1, which comprises in turn a step to apply said adhesive heated at a temperature of at least $T_o$, and a step to heat both of said surfaces at a temperature of at least $(T_o+20)$°C., and a step to join both of said surfaces, wherein $T_o$ being a melting point (°C.) of said water curable polyolefin.

3. A method of claim 2, wherein both of said surfaces are heated at a temperature of at least $T_o$°C. in advance said step to apply said adhesive.

4. A method of claim 1, 2, or 3, wherein heating both of said surfaces are conducted by contacting with a metallic heater held at a high temperature.

5. A method of claim 2, wherein said two polyolefin elements are two cured polyolefin pipes.

6. A method of claim 2, wherein said two polyolefin elements are a cured polyolefin pipe and a cured polyolefin joint.

7. A method of claim 5, wherein said two cured polyolefin pipes are two water cured polyethylene pipes.

8. A method of claim 6, wherein said cured polyolefin pipe is a water cured polyethylene pipe and said cured polyolefin joint is a water cured polyethylene joint.

9. A method of claim 6, wherein before said step to join, the outer surface of said cured polyolefin pipe and the inner surface of said cured polyolefin joint are heated at a temperature of from $(T_o+50)$°C. to $(T_o+180)$°C.

10. A method of claim 2, wherein heating both of said surfaces are conducted by contacting with a metallic heater held at a high temperature.

11. A method of claim 3, wherein heating both of said surfaces are conducted by contacting with a metallic heater held at a high temperature.

* * * * *